United States Patent [19]

Friend

[11] Patent Number: 5,098,771
[45] Date of Patent: Mar. 24, 1992

US005098771A

[54] CONDUCTIVE COATINGS AND INKS

[75] Inventor: Stephen O. Friend, Boxford, Mass.

[73] Assignee: Hyperion Catalysis International, Lexington, Mass.

[21] Appl. No.: 386,829

[22] Filed: Jul. 27, 1989

[51] Int. Cl.$^5$ .................................................. B32B 9/00
[52] U.S. Cl. ....................................... 428/209; 428/323; 428/408; 428/901; 361/397; 361/398; 427/96
[58] Field of Search .............. 428/195, 209, 323, 408, 428/901; 361/397, 398; 427/96

[56] References Cited

U.S. PATENT DOCUMENTS

| | | | |
|---|---|---|---|
| 4,382,882 | 5/1983 | Vogel et al. | 252/503 |
| 4,458,041 | 7/1984 | Chernikhov et al. | 523/435 |
| 4,461,719 | 7/1984 | Vogel et al. | 252/503 |
| 4,525,147 | 6/1985 | Pitz et al. | 433/224 |
| 4,663,230 | 5/1987 | Tennent et al. | 428/367 |
| 4,748,436 | 5/1988 | Kanamori et al. | 338/214 |
| 4,816,289 | 3/1989 | Komatsu et al. | 423/447.3 |

FOREIGN PATENT DOCUMENTS

| | | |
|---|---|---|
| 2326936 | 12/1974 | Fed. Rep. of Germany . |
| 59-152298 | 8/1984 | Japan . |
| 61-132600 | 6/1986 | Japan . |
| 8701317 | 12/1987 | PCT Int'l Appl. . |

OTHER PUBLICATIONS

"Beacon Gas-Conversion Process Yields Useful Carbon Materials" Jap. Pat. Abs. 61-146816, 12/84.

*Primary Examiner*—Patrick J. Ryan

[57] ABSTRACT

An electrically conductive composite in a form suitable for applying to the surface of a substrate that includes a polymeric binder into which carbon fibrils are incorporated.

34 Claims, No Drawings

CONDUCTIVE COATINGS AND INKS

BACKGROUND OF THE INVENTION

This invention relates to electrically conductive composites.

Polymer-based electrically conductive composites (e.g., in the form of coating or inks) are known. These composites are rendered electrically conductive by incorporating an electrically conductive additive.

Carbon fibrils are carbon filaments having diameters less than 500 nanometers. Examples of particular carbon fibrils and methods for preparing them are described in Snyder et al., U.S. Ser. No. 149,573 ("Carbon Fibrils") filed Jan. 28, 1988; Tennent, U.S. Pat. No. 4,663,230 ("Carbon Fibrils, Method for Producing Same and Compositions Containing Same"); Tennent et al., U.S. Ser. No. 871,676 filed June 6, 1986 ("Novel Carbon Fibrils, Method for Producing Same and Compositions Containing Same"); Tennent et al., U.S. Ser. No. 871,675 filed June 6, 1986 ("Novel Carbon Fibrils, Method for Producing Same and Encapsulated Catalyst"); Mandeville et al., U.S. Ser. No. 285,817 filed Dec. 16, 1988 ("Fibrils"); and McCarthy et al., U.S. Ser. No. 351,967 filed May 15, 1989 ("Surface Treatment of Carbon Microfibers"), all of which are assigned to the same assignee as the present application and are hereby incorporated by reference in their entirety.

SUMMARY OF THE INVENTION

In general, the invention features an electrically conductive composite in a form suitable for applying to the surface of a substrate that includes a polymeric binder into which carbon fibrils are incorporated.

In preferred embodiments, the composite is in the form of a powder or liquid coating. The amount of fibrils in the coating preferably is sufficiently high to permit a substrate to which the coating is applied to be electrostatically overcoated directly. Preferably, the amount is less than or equal to 15% by weight (based on resin), more preferably between 0.5 and 10% by weight. Even more preferred are coatings in which the amount of fibrils is between 1 and 4% by weight. The coatings may include one or more pigments.

In another preferred embodiment, the coating is in the form of a resistive ink suitable for screen printing on the surface of a substrate to form an electronic component. Preferably, the amount of fibrils in the resistive ink is sufficient to decrease bulk resistivity of the binder to a value between $10^{-2}$ and $10^6$ ohm cm (more preferably between $10^{-1}$ and $10^4$ ohm cm) when applied to a substrate. The preferred amount of fibrils is between 1 and 30% by weight.

In another preferred embodiment, the coating further comprises electrically conductive graphite or metal particles (e.g., silver flakes, metal-coated chopped fibers, or metal powder) and is in the form of conductive ink suitable for printing on the surface of a substrate; the amount of fibrils in the ink is sufficient to decrease the bulk resistivity of the particle-filled binder (measured in the absence of carbon fibrils) by a predetermined amount when applied to a substrate. Preferably, the bulk resistivity of the particle-filled binder is greater than 1 ohm cm and the amount of fibrils is sufficient to reduce the bulk resistivity to less than 1 ohm cm. Even more preferred are conductive inks in which the bulk resistivity of the particle-filled binder is greater than $10^{-1}$ ohm cm and the amount of fibrils is sufficient to reduce the bulk resistivity to less than $10^{-1}$ ohm cm. The preferred amount of fibrils is between 20 and 50% by weight.

The fibrils preferably are tubes having graphitic layers that are substantially parallel to the fibril axis. One aspect of substantial parallelism is that the projection of the graphite layers on the fibril axis extends for a relatively long distance in terms of the external diameter of the fibril (e.g., at least two fibril diameters, preferably at least five diameters), as described in Snyder et al., U.S. Ser. No. 149,573. These fibrils preferably are also free of a continuous thermal carbon overcoat (i.e. pyrolytically deposited carbon resulting from thermal cracking of the gas feed used to prepare the fibrils). The fibrils preferably have diameters between 3.5 and 75 nanometers, inclusive, and a length to diameter ratio of at least five.

Preferred polymeric binders include thermoplastic resins (e.g., polyethylene, polypropylene, polyamide, polyurethane, polyvinyl chloride, or thermoplastic polyester resin such as polyethylene terephthalate) and thermoset resins (e.g., a thermosetting polyester resin or an epoxy resin).

The invention also features a substrate coated with a fibril filled electrically conductive composite. Preferably, the conductivity of the composite is sufficiently high to permit the coated substrate to be electrostatically overcoated directly. Also preferred are substrates for printed circuit boards in which the composite is a resistive ink printed on the substrate in the form of an electronic component (e.g., a resistor) or a conductive ink printed on the substrate in the form of a conductive trace for electrically connecting electronic components. Also featured are methods for preparing coated substrates (which are amenable to direct electrostatic coating) and for screen printing fibril-filled inks on a substrate.

The fibril-filled composites are electrically conductive at low fibril loadings. As a result, coatings and inks having predetermined resistivity values can be prepared without excessive increases in viscosity due to the added fibrils; such increases are undesirable because they make application difficult. The properties of the composites also do not vary significantly from batch to batch because the fibrils exhibit good resistance to shear degradation caused by the shear mixing used to prepare the composites. In addition, the resistivity of the composites is relatively insensitive to temperature fluctuations When used as a primer on a molded part (e.g., an automotive part) for subsequent electrostatic overcoating, the coatings permit direct electrostatic overcoating at lower energy, thereby reducing corona effects and providing uniform coverage. Moreover, the fibril-filled composites can be overpigmented so that the finished composite does not appear black. The coatings are also sufficiently electrically conductive to be used in combination with sacrificial anode materials on the exposed surface of a metal or molded plastic part to help prevent corrosion. When applied to plastic substrates, the coatings exhibit good mechanical adhesion and permit metal to be plated directly onto the plastic.

Fibril-filled composites in the form of resistive or conductive inks offer additional advantages. When printed on a substrate, the resistivity of the ink and its ability to adhere to the substrate do not deteriorate due to creasing or bending of the substrate. The inks are also scuff- and scratch-resistant. In the case of conductive inks, the fibril-filled inks are lighter than inks in which the conductive filler is 100% metal particles (thereby facilitating application) and exhibit improved corrosion resistance. Moreover, the fibrils allow the resistivity of the metal particle-containing conductive inks to be fine tuned for application-specific uses, thereby achieving resistivity values not readily attainable using metal particles alone.

Other features and advantages of the invention will be apparent from the following description of the preferred embodiments thereof, and from the claims.

DESCRIPTION OF THE PREFERRED EMBODIMENTS

We now describe preferred embodiments of the invention.

Powder and Liquid Coatings

Both powder and liquid coatings consist of a polymeric binder into which carbon fibrils are incorporated. Preferred binders for the powder coatings include the following thermoset resins: urethane polyesters, epoxy, epoxy polyesters, polyester triglycidyl isocyanurates, and urethane or epoxy type polyesters. Suitable thermoplastic resins include polyethylene, polypropylene, polyamide (e.g., nylon), polyvinyl chloride, and thermoplastic polyesters (e.g., polyethylene terephthalate). The molecular weight of the binder is sufficiently high such that it is a solid at room temperature. In the case of liquid coatings, preferred resins are thermoplastic polyesters and polyurethanes. The molecular weight of the binder is sufficiently low such that it is a liquid at room temperature.

Preferably, between 1 and 4% (by weight of resin) of carbon fibrils are incorporated into the binder to form an electrically conductive coating. Such loadings are sufficient to permit direct electrostatic overcoating of a dielectric part (e.g., a plastic) to which the coating is applied. The resistivities of these coatings following application typically are on the order of $10^6$ ohm cm or less.

Preferred fibrils have small diameters (preferably between 3.5 and 75 nanometers), graphitic layers that are substantially parallel to the fibril axis, and are substantially free of a continuous thermal carbon overcoat, as described in Tennent, U.S. Pat. No. 4,663,230; Tennent et al., U.S. Ser. No. 871,675; Tennent et al., U.S. Ser. No. 871,676; Snyder et al., U.S. Ser. No. 149,573; Mandeville et al., U.S. Ser. No. 285,817; and McCarthy et al., U.S. Ser. No. 351,967. These fibrils are prepared as described in the aforementioned patent and patent applications. The fibrils may also be treated to introduce oxygen-containing functional groups onto the fibril surface, as described in McCarthy et al., U.S. Ser. No. 351,967.

The coatings are prepared by combining the binder, fibrils, and additives such as pigments under shear mixing. Once the mixing is complete, the coatings are applied directly to a metal or molded plastic part or stored until needed.

The coatings are applied electrostatically in the mold to sheet molding compound (SMC) and bulk molding compound (BMC) compression molded parts such as automotive body panels. The coated part can then be used as is or electrostatically overcoated with a second coating, e.g., a finishing coat. In either case, the addition of the fibrils to the binder to render the coating electrically conductive makes direct electrostatic overcoating possible.

Inks

Preferred polymeric binders for the resistive and conductive inks are thermoset epoxy resins and thermoplastic polyester resins (e.g., polyethylene terephthalate). The inks may be provided in the form of solutions or solvent dispersions.

Preferred fibrils are those described above in the case of the powder and liquid coatings. The amount of fibrils incorporated in the binder is a function of the desired resistivity level, which in turn is governed by the application for which the inks are intended. In general, for resistive inks having resistivities ranging from $10^{-2}$ to $10^6$ ohm cm, from 1 to 30% by weight of fibrils are incorporated. In the case of conductive inks, which already have relatively low resistivities due to the presence of e.g, silver flakes, the fibrils are used to fine tune the resistivity of the ink, making it possible to achieve resistivity values that are impractical or impossible to obtain simply by adjusting the amount of silver flakes; thus, the amount of fibrils incorporated depends on the resistivity of the silver-filled binder and the targeted resistivity value. In general, between 20 and 50% by weight of fibrils are incorporated to lower the resistivity of silver filled binders having resistivities greater than 1 ohm cm to a value less than 1 ohm cm.

The inks are prepared using the same procedures described above for the conductive powder and liquid coatings. They are then screen printed on a substrate such as a printed circuit board substrate or a disposable donor sheet for such a substrate to form electronic components such as resistors (in the case of resistive inks) or conductive traces for interconnecting electronic components (in the case of conductive inks) by conventional screen printing techniques. The consistent conductivity of the inks eliminates the need for laser trimming, allowing the inks to be used in multilayer molded circuit boards.

Other embodiments are within the following claims.

I claim:

1. An electrically conductive composite in a form suitable for applying to the surface of a substrate, said composite comprising a polymeric binder into which carbon fibrils in an amount not greater than 30% by weight are incorporated.

2. The composite of claim 1 wherein said composite is in the form of a powder coating, the molecular weight of said binder being sufficiently high such that it is a solid at room temperature.

3. The composite of claim 1 wherein said composite is in the form of a liquid coating, the molecular weight of said binder being sufficiently low such that it is a liquid at room temperature.

4. The coating of claim 2 or 3 wherein the amount of said fibrils permits a substrate to which said coating has been applied to be electrostatically overcoated directly.

5. The coating of claim 2 or 3 wherein the amount of said fibrils is less than or equal to 15% by weight.

6. The coating of claim 5 wherein the amount of said fibrils is between 0.5 and 10% by weight.

7. The coating of claim 6 wherein the amount of said fibrils is between 1 and 4% by weight.

8. The coating of claim 2 or 3 wherein the amount of said fibrils is between 1 and 4% by weight and permits a substrate to which said coating has been applied to be electrostatically overcoated directly.

9. The composite of claim 1 wherein said composite is in the form of a resistive ink suitable for screen printing on the surface of a substrate to form an electronic component.

10. The resistive ink of claim 9 wherein said resistivity is between $10^{-1}$ and $10^4$ ohm cm.

11. The resistive ink of claim 9 wherein the amount of said fibrils is between 1 and 30% by weight.

12. The resistive ink of claim 9 wherein the amount of said fibrils is between 1 and 30% by weight and is sufficient to decrease the bulk resistivity of said binder to a value between $10^{-2}$ and $10^6$ ohm cm when applied to a substrate.

13. The composite of claim 1 wherein said composite further comprises electrically conductive graphite or metal particles and is in the form of a conductive ink suitable for printing on the surface of a substrate, the amount of said fibrils decreasing the bulk resistivity of the particle-filled binder by a predetermined amount when applied to a substrate.

14. The conductive ink of claim 18 wherein the bulk resistivity of said particle-filled binder is greater than $10^{-1}$ ohm cm and the amount of said fibrils reduces the bulk resistivity to less than $10^{-1}$ ohm cm.

15. The conductive ink of claim 13 wherein the bulk resistivity of said particle-filled binder is greater than 1 ohm cm, and the amount of said fibrils is less than or equal to 30% by weight and reduces the bulk resistivity to less than 1 ohm cm.

16. The conductive ink of claim 13 wherein said metal particles comprise silver flakes.

17. The composite of claim 1 wherein said fibrils comprise tubes having graphitic layers that are substantially parallel to the fibril axis.

18. The composite of claim 17 wherein the length to diameter ratio of said fibrils is at least 5.

19. The composite of claim 17 wherein the diameter of said fibrils is between 3.5 and 75 nanometers, inclusive.

20. The composite of claim 17 wherein said fibrils are substantially free of a continuous thermal carbon overcoat.

21. The composite of claim 1 wherein said binder comprises a thermoplastic resin.

22. The composite of claim 21 wherein said binder comprises a polyethylene, polypropylene, polyamide, polyurethane, polyvinyl chloride, or thermoplastic polyester resin.

23. The composite of claim 1 wherein said binder comprises a thermoset resin.

24. The composite of claim 23 wherein said binder comprises a saturated polyester, alkyd, or epoxy resin.

25. The coating of claim 2 or 3 further comprising at least one pigment.

26. A substrate coated with an electrically conductive composite comprising a polymeric binder into which carbon fibrils in an amount not greater than 30% by weight are incorporated.

27. The substrate of claim 26 wherein the conductivity of said composite permits said substrate to be electrostatically overcoated directly.

28. The substrate of claim 26 wherein said substrate comprises a substrate for a printed circuit board and said composite is a resistive ink printed on said substrate in the form of an electronic component.

29. The substrate of claim 28 wherein said electronic component is a resistor.

30. The substrate of claim 26 wherein said substrate comprises a substrate for a printed circuit board and said composite is a conductive ink printed on said substrate in the form of a conductive trace for electrically connecting electronic components.

31. A method for coating a substrate comprising the steps of preparing an electrically conductive coating by incorporating carbon fibrils in an amount not greater than 30% by weight into a polymeric binder; and applying said coating to said substrate.

32. The method of claim 31 further comprising electrostatically applying an overcoating directly to the coated substrate.

33. A method for printing on a substrate comprising the steps of preparing an ink by incorporating carbon fibrils in an amount not greater than 30% by weight into a polymeric binder; and screen printing said ink on said substrate.

34. The coating of claim 25 wherein said coating is overpigmented such that it does not appear black.

* * * * *